United States Patent [19]
Kim

[11] Patent Number: 6,133,564
[45] Date of Patent: Oct. 17, 2000

[54] SCANNING AREA DETECTION METHOD FOR SHUTTLE SCANNER

[75] Inventor: Han-Sin Kim, Seoul, Rep. of Korea

[73] Assignee: SamSung Electronics Co., Ltd., Suwon, Rep. of Korea

[21] Appl. No.: 09/119,774

[22] Filed: Jul. 21, 1998

[30] Foreign Application Priority Data

Jul. 23, 1997 [KR] Rep. of Korea ................... 97-34346

[51] Int. Cl.$^7$ ..................................................... H01J 3/14
[52] U.S. Cl. ............... 250/234; 250/559.36; 250/559.24; 358/449; 358/486
[58] Field of Search ................ 200/234, 559.37, 200/559.29, 559.39; 358/501, 449, 453, 406, 486; 399/45; 250/559.36, 559.3, 559.24

[56] References Cited

U.S. PATENT DOCUMENTS 5,805,308  9/1998  Tanaka et al. ........................... 358/486
5,895,928  3/1999  Kerschner ........................... 250/559.37

*Primary Examiner*—Que T. Le
*Assistant Examiner*—Thanh X. Luu
*Attorney, Agent, or Firm*—Robert E. Bushnell, Esq.

[57] ABSTRACT

A scanning area detection method applies to a shuttle scanner having a position sensor mounted with respect to a paper guide of the shuttle scanner, with the position sensor outputting an electrical signal indicative of the position of the paper guide. The method includes the steps of: adjusting the position of the paper guide according to the width of a document to be scanned; determining a width value of the document to be scanned according to the electrical signal output of the position sensor and storing the detected width value in a memory; and scanning a block by slices while incrementing a slice coefficient, at least until the slice coefficient of the last scanned slice of the block reaches the stored width value. The shuttle scanner processes block slices corresponding to a physical scanning limit of the shuttle scanner minus the determined width value, as extra-document data. If it is determined that the mode of operation of the shuttle scanner is a facsimile mode, the extra-document data is processed as white data. Otherwise, the extra-document data is processed as a null value.

20 Claims, 2 Drawing Sheets

SCANNING AREA DETECTION METHOD FOR SHUTTLE SCANNER

CLAIM OF PRIORITY

This application makes reference to, incorporates the same herein, and claims all benefits accruing under 35 U.S.C. §119 from my application entitled Assignable Method and Apparatus for Scanning Area in a Shuttle Scanner filed with the Korean Industrial Property Office on Jul. 23, 1997 and there duly assigned Serial No. P97-34346 by that Office.

BACKGROUND OF THE INVENTION

1. Field of the Invention

This invention is related to image scanners and, more particularly, to a scanning area detection method for use with a shuttle scanner which utilizes a document-size detection sensor mounted on a paper guide to reduce data transmission time and improve image output quality.

2. Discussion of Related Art

In the case of a general-purpose image scanner, such as that used in a typical facsimile machine which uses a white roller or white bar as a background and spans the entire mechanically available area (width) for scanning, all points other than the actual image data are processed as "white" data, i.e., blank. Accordingly, any area lying outside that of the document original is scanned as white and is thereafter processed as white data at the time of reproduction (e.g., printing).

Meanwhile, with the aid of graphics software, a user-selectable scanning area is made possible, so that specified areas can be scanned and the captured data processed. For example, a pre-scanning function is used to set precisely the area to be scanned, wherein low-resolution, rapid scanning is first performed over a large area in order to catch the general shape of an image to be scanned, with the captured data being displayed the monitor of a computer system for more precise scanning of a specific area.

While neither of the above scanning systems is a matter for concern since non-document areas can be processed as white data, in the case of a shuttle scanner module, which is the technique most often employed in a multifunction machine such as a printer/scanner, a unique problem arises. That is, in using the typical shuttle scanner, the travel of the scanner module is determined by the maximum allowable width of the scanning medium, e.g., paper, so that any area beyond the width a given sheet of paper is also scanned and processed. This extra-document data is unavoidably captured and is usually processed as black (or nearly black) data. Therefore, since a sizable portion of the left or right side of the reproduced results is ultimately printed as a virtually all black image, the consumption of ink or toner is excessive. Furthermore, under such printing conditions, print quality is diminished and is unsightly in general.

In particular, these phenomena create undesirable conditions and unfavorable results during facsimile transmission and especially at the point of facsimile reception. Moreover, data transmission time is unnecessarily long.

SUMMARY OF THE INVENTION

Accordingly, in order to overcome such drawbacks in the conventional art, it is therefore an object of the present invention to provide a method which prevents "black" data (i.e., that generated from the area other than a manuscript) from being reproduced when using a shuttle scanner.

It is another object to provide a method of preventing ink or toner from being used wastefully.

A further object of the present invention is to provide a method of increasing print quality.

To achieve these and other advantages and in accordance with the purpose of the present invention, as embodied and broadly described, there is provided a scanning area detection method for a shuttle scanner having a position sensor mounted with respect to a paper guide of the shuttle scanner, with the position sensor outputting an electrical signal indicative of the position of the paper guide. The method comprises the steps of: adjusting the position of the paper guide according to the width of a document to be scanned; determining a width value of the document to be scanned according to the electrical signal output of the position sensor and storing the detected width value in a memory; and scanning a block by slices while incrementing a slice coefficient, at least until the slice coefficient of the last scanned slice of the block reaches the stored width value.

In the above method, the width of any document to be scanned is detected through the use of a position sensor mounted on the paper guide of a shuttle scanner, so that the actual size (width) of the document can be determined and the unnecessary portions of the scanning area can be processed as white data or skipped entirely.

BRIEF DESCRIPTION OF THE ATTACHED DRAWINGS

A more complete appreciation of the invent ion, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

Figure 1A:
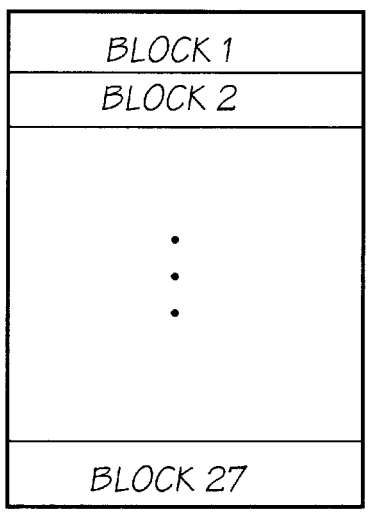
FIGS. 1A and 1B are views illustrating the scanning operation of a shuttle scanner, showing an entire document to be scanned and a shuttle-sized block, respectively.
Figure 1B:
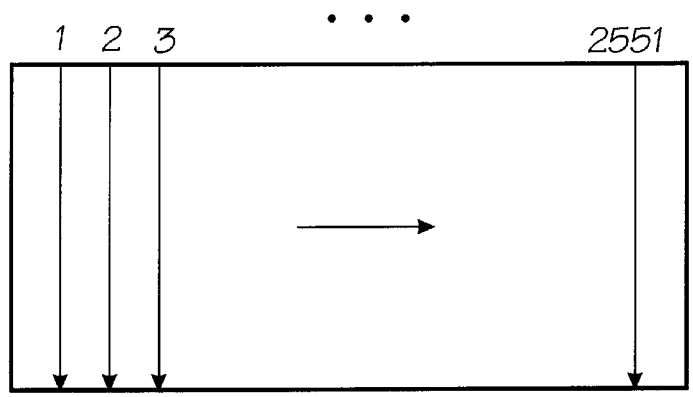

As shown in FIG. 1A, in scanning a document original using a shuttle scanner module, scanning is performed by dividing the sheet into 22–27 shuttle blocks, depending on the dimensions of the scanner module. In the scanning of a given shuttle block, as shown in FIG. 1B, a vertical trace or slice is scanned, with the scanner module moving across the sheet in a horizontal direction and proceeding with a sequential scanning of each slice until reaching the far edge of the sheet. Here, the 2,551st slice represents the final slice of a scanned block of a letter-sized sheet of paper, assuming a resolution of 300 dpi.

Meanwhile, in performing a scanning operation using a shuttle scanner adopting the method according to the present invention, in order to determine the size (width) of a document original to be scanned, a position sensor such as a photo detector is first installed with respect to a paper guide whose position is adjusted (set) at the time of paper feed according to sheet width, The position sensor detects the position of the paper guide and outputs a voltage according to the setting of the paper guide so that, as the set position of the paper guide is varied, a variable sensor output representative of the document width can be transmitted to the CPU of an image data-processing apparatus.

Figure 2:
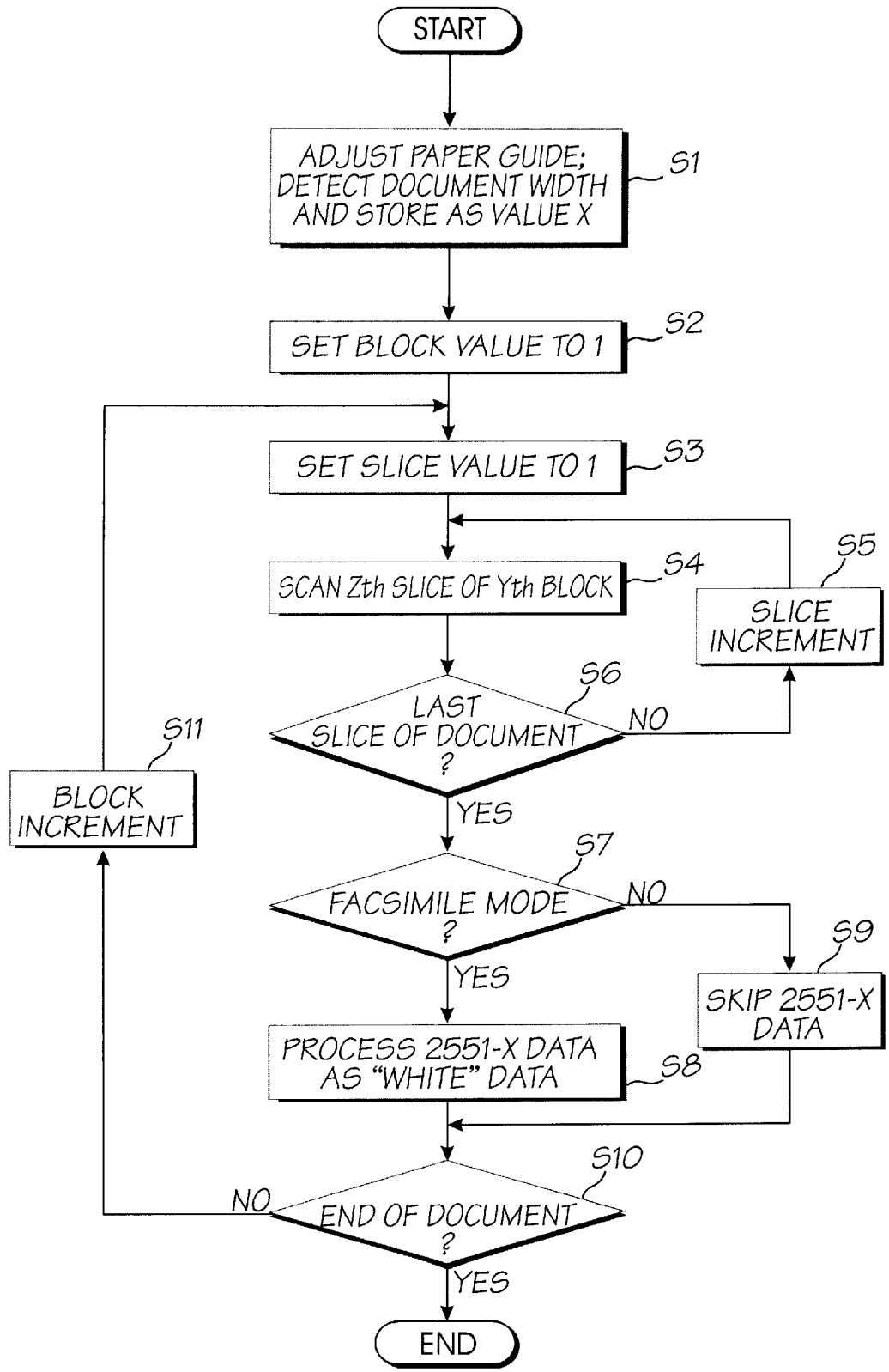
FIG. 2 is a flow chart illustrating the scanning area detection method according to the present invention.

Referring to FIG. 2, the paper guide (not shown in the drawings) is set according to the width of a sheet of paper fed into the shuttle scanner, and the position sensor (not shown in the drawings) detects the set position and outputs a document width value X which is stored in a memory (not shown in the drawings) in a step S1. Here, value X represents the sheet width of the document to be scanned.

To begin scanning the first block of the document, a block coefficient Y is set to a value of "1" in a step S2 and a slice coefficient Z is set to a value of "1" in a step S3. Thus, the scanning of the Zth slice of the Yth block is performed in a step S4 and the captured image data is stored.

After the scanning of each slice, the slice coefficient Z is increased by one in a step S5 until it is determined in a step S6 that the value of Z reaches that of X. That is, once the last slice of the document is scanned, i.e., when Z=X, it is determined that the document's width has been completely scanned.

Then, in order to properly process the image data and streamline the data processing function of an image-forming apparatus and thereby, the current mode of the apparatus is checked in a step S7. In the case of a facsimile mode where full data transmission is required, the image data of the extra-document area, which runs from the edge of the recognized width of the document to the physical limit of the scanning area, is processed as "white" data which, in an 8-bit system, would have a pixel level of 255. Thus, the data from slice X to slice 2551 is processed in a step S8. If the apparatus is in some other mode, as in a step S9, the processing of this data is merely omitted (skipped) by processing it as a null value.

Figure 3:
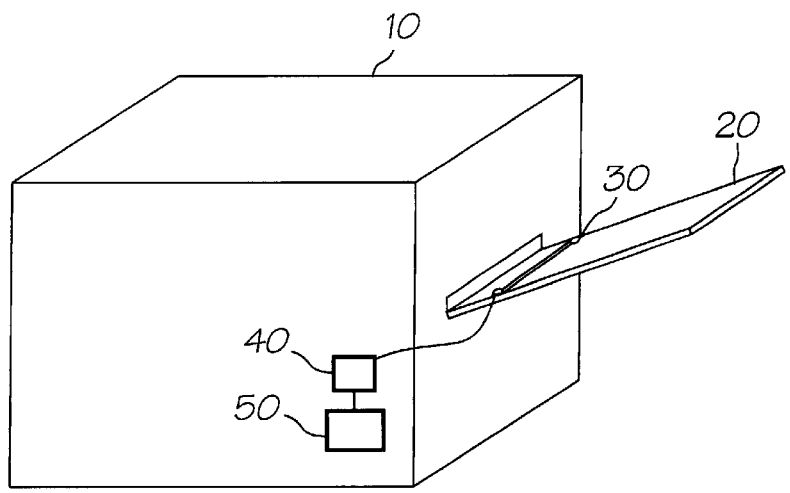
FIG. 3 shows one embodiment of the shuttle scanner, in accordance with the principles of the present invention.

The above steps are repeated until the entire document is scanned. That is, in a step S10, it is determined whether the block value Y has reached a predetermined value (i.e., the last block) in accordance with the system, until which point scanning continues by incrementing the block value (Y=Y+1) in a step S11, in order to scan the next block from the step S3 (Z=1). As shown in FIG. 3, a scanner 10 includes an adjustable paper guide 30 on a paper tray 20, a sensor 40, and a memory 50.

It will be apparent to those skilled in the art that various modifications can be made in the scanning area detection method for a shuttle scanner of the present invention, without departing from the spirit of the invention. Thus, it is intended that the present invention cover such modifications as well as variations thereof, within the scope of the appended claims and their equivalents.

What is claimed is:

1. A scanning area detection method for a shuttle scanner having a position sensor mounted with respect to a paper guide of said shuttle scanner, said position sensor outputting an electrical signal indicative of the position of said paper guide, said method comprising the steps of:

adjusting a position of said paper guide according to a width of a document carrying image data to be scanned;

determining a width value of the document according to the electrical signal output of said position sensor and storing the detected width value in a memory;

scanning a block of the image data by slices while incrementing a slice coefficient, at least until the slice coefficient of the last scanned slice of the block reaches the stored width value, said shuttle scanner processing block slices corresponding to a physical scanning limit of said shuttle scanner minus the determined width value as extra-document data;

identifying a mode of operation of said scanner;

when the mode of operation corresponds to a facsimile mode, setting the extra-document data to be considered as white data and not omitting the extra-document data; and when the mode of operation does not correspond to the facsimile mode, omitting the extra-document data.

2. The method of claim 1, the white data in an eight-bit system having a pixel level of 255.

3. The method of claim 1, further comprising the step of setting the extra-document data to be considered as null data, when it is determined that the mode of operation of said shuttle scanner is not a facsimile mode.

4. The method of claim 1, said adjusting step being performed by a user.

5. A method, comprising:

adjusting a paper guide of a shuttle scanner unit according to a width of a document carrying image data to be scanned;

identifying a width value of the document according to a signal of a position sensor and storing said width value in a memory, said signal corresponding to position of said adjusted paper guide, said image data being divisible into a plurality of blocks of data oriented in a first direction across a face of the document and a plurality of slices of data oriented in a second direction substantially perpendicular to said first direction;

within a first block of data, scanning a plurality of slices of data from an initial slice through at least to a slice corresponding to said width value;

setting slices of said data located in a region between a physical scanning limit of said scanner unit and said width value to be extra-document data;

identifying a mode of operation of said scanner unit;

when said mode of operation corresponds to a facsimile mode, setting said extra-document data to be considered as white data and not omitting said extra-document data; and when said mode of operation does not correspond to said facsimile mode, omitting said extra-document data.

6. The method of claim 5, further comprising setting a current slice value to a predetermined initial slice value, said initial slice corresponding to said predetermined initial slice value.

7. The method of claim 6, further comprising incrementing said current slice value by one when each one individual slice is scanned.

8. The method of claim 7, further comprising setting a current block value to a predetermined initial block value, said first block of data corresponding to said predetermined initial block value.

9. The method of claim 8, further comprising:

incrementing said current block value; and within a block corresponding to said incremented current block value, scanning a plurality of slices of data from a slice corresponding to a first slice through at least to a slice corresponding to said width value, incrementing said current slice value by one when each one individual slice is scanned.

10. The method of claim 5, further comprising setting a current block value to a predetermined initial block value, said first block of data corresponding to said predetermined initial block value.

11. The method of claim 10, further comprising:

incrementing said current block value; and within a block corresponding to said incremented current block value, scanning a plurality of slices of data from a slice corresponding to a first slice through at least to a slice corresponding to said width value, incrementing said current slice value by one when each one individual slice is scanned.

12. The method of claim 5, wherein said white data in an eight-bit system have a pixel level of 255.

13. The method of claim 5, further comprising setting said extra-document data to be considered as null data, when it is determined that said mode of operation of said scanner unit is not a facsimile mode.

14. The method of claim 5, wherein said adjusting is performed by a user.

15. The method of claim 5, further comprising, when said mode of operation corresponds to a facsimile mode, transmitting said extra-document data.

16. A method, comprising:

adjusting a paper guide of a shuttle scanner unit according to a width of a document carrying image data to be scanned;

identifying a width value of the document according to a signal of a position sensor and storing said width value in a memory, said signal corresponding to position of said adjusted paper guide, said image data being divisible into a plurality of blocks of data oriented in a first direction across a face of the document and a plurality of slices of data oriented in a second direction substantially perpendicular to said first direction;

setting a current block value to a predetermined initial block value;

setting a current slice value to a predetermined initial slice value;

within a first block corresponding to said initial block value, scanning a plurality of slices of data from a slice corresponding to said initial slice value through at least to a slice corresponding to said width value, incrementing said current slice value when each slice is scanned;

setting slices of data of said first block located in a region between a physical scanning limit of said scanner unit and said width value to be first extra-document data;

identifying a mode of operation of said scanner unit;

when said mode of operation corresponds to a facsimile mode, setting said extra-document data to be considered as white data and not omitting said extra-document data;

when said mode of operation does not correspond to said facsimile mode, omitting said extra-document data;

incrementing said current block value;

within a second block corresponding to said incremented current block value, scanning a plurality of slices of data from a slice corresponding to said initial slice value through at least to a slice corresponding to said width value, incrementing said current slice value when each slice is scanned;

setting slices of data of said second block located in a region between a physical scanning limit of said scanner unit and said width value to be first extra-document data;

identifying a mode of operation of said scanner unit;

when said mode of operation corresponds to a facsimile mode, setting said extra-document data to be considered as white data and not omitting said extra-document data; and when said mode of operation does not correspond to said facsimile mode, omitting said extra-document data.

17. The method of claim 16, wherein said white data in an eight-bit system have a pixel level of 255.

18. The method of claim 16, further comprising setting said extra-document data to be considered as null data, when it is determined that said mode of operation of said scanner unit is not a facsimile mode.

19. The method of claim 18, wherein said adjusting is performed by a user.

20. The method of claim 19, further comprising, when said mode of operation corresponds to a facsimile mode, transmitting said extra-document data.

* * * * *